Dec. 1, 1931.　　　　　F. BARZ　　　　　1,834,887
ELECTRICAL REGULATING SYSTEM
Filed April 23, 1931
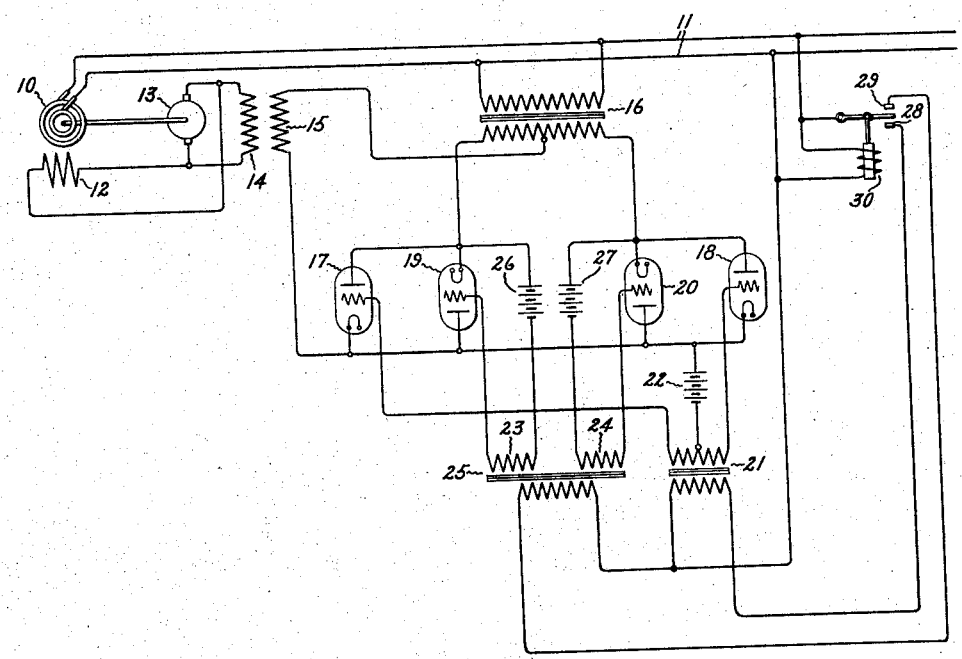
Inventor:
Friedrich Barz,
by Charles V. Miller
His Attorney.

Patented Dec. 1, 1931

1,834,887

UNITED STATES PATENT OFFICE

FRIEDRICH BARZ, OF BERLIN-FRIEDENAU, GERMANY, ASSIGNOR TO GENERAL ELECTRIC COMPANY, A CORPORATION OF NEW YORK

ELECTRICAL REGULATING SYSTEM

Application filed April 23, 1931, Serial No. 532,353, and in Germany May 10, 1930.

My invention relates to electrical regulating systems and more particularly to such systems utilizing electric valves for regulating an electrical condition of a dynamo-electric machine.

Heretofore, there have been proposed numerous arrangements including electric valves for regulating an electrical condition of a dynamo-electric machine. The majority of these arrangements of the prior art have operated upon the main field winding of the dynamo-electric machine itself or of an auxiliary exciter so that the regulating apparatus has been required to carry the total exciting current of the main dynamo-electric machine or its exciter. It has been found that a regulating apparatus which is required to carry only a portion of the exciting current of the main machine or its exciter has material advantages in the way of a decrease in size and cost, and an increase in flexibility, sensitivity, etc.

It is an object of my invention to provide an improved electrical regulating system for regulating an electrical condition of a dynamo-electric machine which will embody the above-mentioned advantages and which will be simple, economical and reliable in operation.

It is a further object of my invention to provide an improved electrical regulating system for regulating an electrical condition of a dynamo-electric machine in which the machine itself or its auxiliary exciter is provided with an auxiliary winding and in which the average value of the total excitation of the machine or its exciter is determined by rapidly reversing the direction of excitation of the auxiliary winding, the average value of such excitation depending upon the relative intervals during which the auxiliary winding is excited with one polarity or the other.

It is a still further object of my invention to provide an improved electrical regulating system for regulating an electrical condition of the dynamo-electric machine in which the machine or its auxiliary exciter is provided with an additional winding which is energized from an alternating current circuit through a pair of oppositely connected rectifiers and in which the rectifiers are selectively rendered conductive in accordance with variations of the electrical condition of the machine which it is desired to regulate.

In accordance with my invention a dynamo-electric machine, which may be either a direct or alternating current generator or motor or its auxiliary exciter, is provided with an additional field winding which may be excited to act differentially or cumulatively with the main field winding. This additional field winding is energized from an alternating current circuit, which may be connected to the main dynamo-electric machine in case it is an alternating current machine, through a pair of oppositely connected electric valve rectifiers, each of the valves of which are provided with a control grid. Each of the rectifiers is provided with a grid transformer which is energized with opposite polarity from the alternating current circuit through a control device. The control device selectively energizes one or the other of the grid transformers in response to an operating condition of the dynamo-electric machine which it is desired to regulate, such, for example, as the voltage, current, power, speed, or any other of the well-known characteristics which it is customary to regulate. With such an arrangement the polarity of the excitation of the additional winding of the dynamo-electric machine or its exciter is rapidly reversed, the relative duration of the intervals during which this winding is excited at one polarity or the other determining its average excitation and thus the electrical condition of the machine.

For a better understanding of my invention, together with other and further objects thereof, reference is had to the following description taken in connection with the accompanying drawing and its scope will be pointed out in the appended claims. The single figure of the accompanying drawing illustrates my invention as applied to an arrangement for maintaining constant the voltage of a synchronous generator provided with an auxiliary exciter.

Referring now to the drawing, I have illustrated an arrangement for maintaining constant the voltage of a synchronous generator 10 connected to an alternating current circuit 11. The generator 10 is provided with a field winding 12 which is energized directly across the terminals of an exciter 13 connected to the generator 10. The exciter 13 is provided with a main field winding 14 connected across its terminals and an auxiliary winding 15 which is adapted to be energized from the alternating current circuit 11 through a pair of oppositely connected rectifiers. These rectifiers are illustrated as being energized from the alternating current circuit 11 through a single transformer 16, although it will be obvious to those skilled in the art that separate transformers may be used or that a single transformer with insulated secondary windings may be used if so desired without departing from my invention. The rectifiers comprise, together with the transformer 16, electric valves 17 and 18 and 19 and 20 respectively. Each of the valves 17-20 inclusive is provided with an anode, a cathode and a control grid and may be of any of the several types well known in the art although I prefer to use valves of the vapor electric discharge type. The control grids of electric valves 17 and 18 are connected to their common cathode circuit through opposite halves of the secondary winding of a grid transformer 21 and a negative bias battery 22. Similarly the control grids of electric valves 19 and 20 are connected to their respective cathodes through the secondary windings 23 and 24 of a grid transformer 25 and the negative bias batteries 26 and 27 respectively. The primary windings of the grid transformers 21 and 25 are adapted to be energized with opposite polarity from the alternating current circuit 11, through the contacts 28 and 29, respectively, of a contact-making voltmeter 30, the coil of which is connected across the alternating current circuit 11.

In explaining the operation of the above-described apparatus it will be assumed that, at a given instant, the voltage generated by the machine 10 and supplied to the alternating current circuit 11 is momentarily above normal. Under this condition the contact-making voltmeter 30 will complete a circuit through its contact 29 to energize the primary winding of grid transformer 25 and thus impress an alternating potential upon the grids of electric valves 19 and 20 which is substantially in phase with the anode potentials of these valves. The valves 19 and 20 are connected with the transformer 16 in a conventional manner to obtain full wave rectification for energizing the direct circuit comprising the auxiliary winding 15 of the exciter 13. With the valves 19 and 20 rendered conductive as just described the auxiliary winding 15 is energized with such a polarity that it acts differentially with respect to the main winding 14 to lower the voltage of the exciter 13 and thus the voltage of the machine 10. As soon as the voltage of machine 10 and the alternating current circuit 11 drops below normal, the contact-making voltmeter 30 will complete a circuit through its contact 28 to energize the primary winding of grid transformer 21 and thus render electric valves 17 and 18 conducting, at the same time removing the excitation from grid transformer 25 so that the valves 19 and 20 become non-conductive. It will be noticed that the electric valves 17 and 18 are oppositely connected with respect to the valves 19 and 20 so that the polarity of the direct current circuit including the auxiliary winding 15 is reversed and the winding 15 is energized to act cumulatively with the winding 14 to increase excitation of the exciter 13 and thus increase the voltage of the machine 10 and alternating current circuit 11. Under the conditions described above the full regulating effect of auxiliary winding 15 will be successively applied in opposite directions so that the instantaneous voltage of the machine 10 and the alternating current circuit 11 is continuously and rapidly fluctuating slightly above and below the normal value which is desired to be maintained. The relative duration of the intervals when the auxiliary winding is energized with one polarity and those during which it is energized with the opposite polarity determining the average excitation of the exciter 13 and the average voltage of the circuit 11. The periodic reversals of the polarity of the auxiliary winding 15 may be made sufficiently rapid, by properly designing the circuit constants and the contact-making voltmeter 30, that the instantaneous voltage of the alternating current circuit 11 may be maintained within narrowly prescribed limits.

While I have described my invention as applied to an arrangement for maintaining constant the voltage of a synchronous generator, it will be obvious to those skilled in the art that any dynamo-electric machine, such as an alternating current motor or generator or direct current motor or generator, may be similarly controlled and that the control may be effected in response to voltage, current, power, speed, or any other similar operating condition of the machine, by means of which it is customary to regulate electrical apparatus, all without departing from my invention.

While I have described what I at present consider the preferred embodiment of my invention it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In an electrical regulating system, the combination of a dynamo-electric machine provided with a field winding, an alternating current circuit, means for exciting said winding from said circuit including a pair of electric valves connected in said circuit with opposite polarity, and means responsive to an operating condition of said machine for selectively rendering one of said valves conductive.

2. In an electrical regulating system, the combination of a dynamo-electric machine, excitation means therefor including a pair of field windings, means for supplying substantially constant excitation to one of said windings, an alternating current circuit, means for exciting said other winding from said circuit including a pair of electric valves oppositely connected in said circuit, and means responsive to an operating condition of said machine for selectively rendering one of said valves conductive.

3. In an electrical regulating system the combination of a synchronous generator, a direct current exciter therefor, said exciter being provided with a pair of field windings one of which is self excited, a circuit for exciting said other winding from said generator including a pair of electric valves oppositely connected in said circuit, and means responsive to an electrical condition of said generator for selectively rendering one of said valves conductive.

4. In an electrical regulating system, the combination of a dynamo-electric machine provided with a field winding, an alternating current circuit, means for exciting said winding from said circuit including two oppositely connected electric valve rectifiers, and means responsive to an operating condition of said machine for selectively controlling said rectifiers.

5. In an electrical regulating system, the combination of a dynamo-electric machine provided with a field winding, an alternating current circuit, means for exciting said winding from said circuit including two oppositely connected electric valve rectifiers, each of the valves of said rectifiers being provided with a control grid, and means responsive to an electrical condition of said machine for selectively impressing upon the grids of the valves of a single rectifier an alternating potential substantially in phase with their anode potentials.

6. In a voltage regulating system, the combination of a synchronous generator, an exciter therefor provided with a pair of field windings one of which is self-excited, means for exciting said other winding from said generator including two oppositely connected electric valve rectifiers, each of the valves of said rectifiers being provided with a control grid, a grid transformer associated with each rectifier for exciting the valve grids thereof, and a voltage responsive relay energized in accordance with the voltage of said generator and connected to selectively energize said grid transformers with an alternating potential substantially in phase with the anode potentials of their corresponding rectifiers.

In witness whereof, I have hereunto set my hand.

FRIEDRICH BARZ.